FIG. I.

United States Patent Office 3,598,695
Patented Aug. 10, 1971

3,598,695
PRODUCTION OF WOOD PULP BY AN AMMO-
NIUM SULFITE AND/OR BISULFITE PROC-
ESS COMBINED WITH A SULFATE PROCESS
Hans Waterstradt, Walldorf, Hessen, Germany, assignor to Metallgesellschaft Aktiengesellschaft, Frankfurt am Main, Germany
Filed June 26, 1968, Ser. No. 740,194
Claims priority, application Germany, June 26, 1967, M 75,238
Int. Cl. D21c 11/02, 11/04
U.S. Cl. 162—33                                     7 Claims

ABSTRACT OF THE DISCLOSURE

Combined wood pulping processes wherein the conventional ammonium sulfite or bisulfite process is carried out; the conventional sulfate process is carried out; and the spent liquor from the ammonium-based process is treated with sulfuric acid and sodium hydroxide to liberate ammonia, sulfur dioxide and sodium sulfate. The sodium sulfate is used in the liquor recovery portion of the sulfate process, and the ammonia and sulfur dioxide are absorbed in water to produce ammonium sulfite or bisulfite which is used in the ammonium-based pulping process.

---

Figure 1:
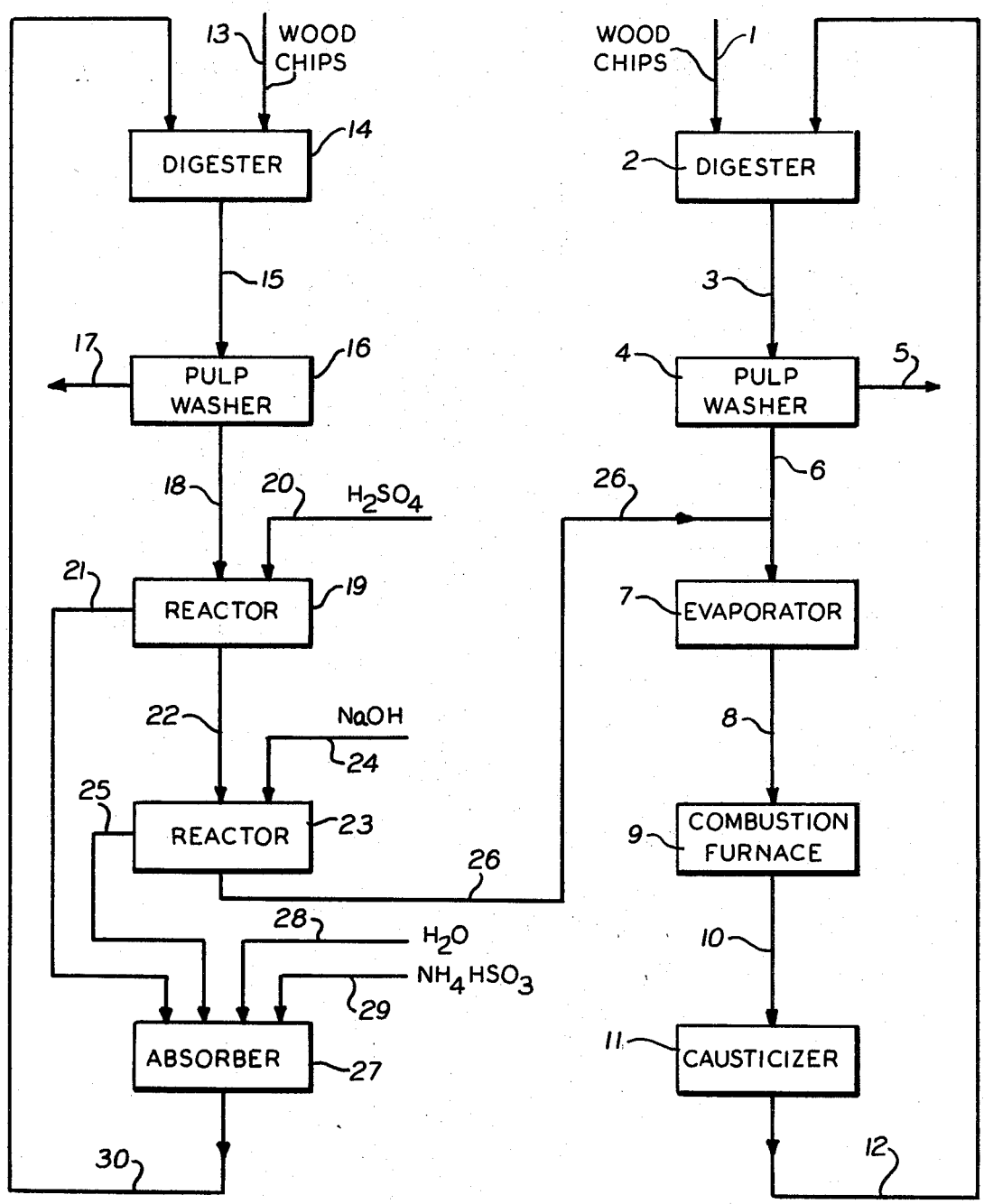

The invention relates to a method for the simultaneous production of pulp by the sulfate process and the ammonium bisulfite or ammonium sulfite process. In this method, sulfuric acid and sodium hydroxide solution are added to spent liquor which contains ammonium sulfite or ammonium bisulfite and the resulting liquor is used to replenish the chemicals which have been consumed in the sulfate process.

In various known processes for recovering pulp from wood or lignified plants, the chips made in a chipper are cooked in pressure cookers with cooking liquors, which dissolve out the lignin as selectively as possible so that a subsequent mechanical action results in a disintegration of the chips into fiber bundles or individual fibers. The sulfite and sulfate processes are the most important processes for the production of pulp.

In the sulfate process, the wood is digested by a cooking of the chips with a solution which is called white liquor and contains sodium hydroxide and sodium sulfide as active ingredients. The loss of chemicals during the digestion is made up by an addition of sodium sulfate before the combustion of the spent liquor (black liquor), which has been concentrated by evaporation. The description of the process as a sulfate process is due to this addition of sodium sulfate. The combustion of the black liquor results in a reduction of sodium sulfate to sodium sulfide and in a formation of sodium carbonate from sodium hydroxide. The dissolved melt is causticized with lime to produce fresh white liquor, which contains sodium hydroxide and sodium sulfide as active ingredients (see, e.g., Rydholm "Pulping Processes," Interscience Publishers, New York, London, Sidney, 1965, page 792). Paper pulps having very good strength properties can be made by the sulfate process even from wood having a high resin content and wood from some deciduous trees, such as birch.

In the sulfite process, the wood chips are cooked with a solution which contains bisulfite of calcium, magnesium, sodium or ammonium and, if desired, free sulfur dioxide.

Neutral sulfite processes are also known, in which the cooking liquor consists of sodium sulfite or ammonium sulfite and, if desired, a buffer.

It is known to add chemicals to a sulfate pulping process by a supply of spent liquor from a sodium bisulfite or sodium sulfite process rather than sodium sulfate to the chemical recovery cycle of the sulfate process. Such process, in which spent liquor from a plant performing a sodium sulfite or sodium bisulfite pulping process is supplied as a source of chemicals to a neighboring sulfate or kraft pulping plant, is described as a "cross recovery system" (see Rydholm, loc. cit., page 795). This process affords to a large extent a solution to the problem involved in the spent liquor from the sodium sulfite or sodium bisulfite process. On the other hand, sodium sulfite and sodium sulfite processes are increasingly superseded by ammonium sulfite or ammonium bisulfite processes because the replacement of ammonium for sodium affords a number of considerable advantages in pulping. For instance, the yield of pulp and the quality of the pulp are improved. A satisfactory recovery of chemicals used in an ammonium sulfite or ammonium bisulfite process has not yet been accomplished. The combustion of the spent liquor results in a combustion of ammonium or ammonia to form nitrogen, which cannot be reused. Besides, the spent liquor cannot be used in the sulfate process.

It is an object of this invention to modify these existing processes so as to make full use of the chemical contents of the waste or spent streams thereof.

It is another object of this invention to provide a combination sulfite-sulfate process which is extremely economical.

Other and additional objects of this invention will become apparent from a consideration of this entire specification, including the drawing and claims hereof.

In accord with and fulfilling these objects, one aspect of this invention resides in carrying out, in a conventional manner, both a sulfate pulping process and an ammonium sulfite or bisulfite pulping process; treating the spent liquor from the ammonium process with both sulfuric acid and sodium hydroxide, whereby to release sulfur dioxide and ammonia gases and sodium sulfate; combining the sulfur dioxide and ammonia gases with each other and water to form ammonium sulfite or bisulfite; feeding the ammonium compound to the ammonium pulping process; and feeding the sodium sulfate to the sulfate pulping process.

It has been found that the surplus cooking chemicals contained in the spent liquor from an ammonium sulfite or ammonium bisulfite pulping process can, according to this invention, be recovered in a simple and economical manner and can be reused for pulping. In the method of this invention pulp is produced by the sulfate process and the ammonium sulfite or ammonium bisulfite process, and the produced sodium sulfate is added to the black liquor from the sulfate process, the resulting liquor is concentrated by evaporation. the concentrated liquor is burnt, the combustion residue is dissolved, the solution is causticized and the caustic solution is reused for pulping.

The process, according to the invention, is characterized in that sulfuric acid is added to the spent liquor from the ammonium sulfite or ammonium bisulfite process to transform the sulfite or bisulfite into sulfate and to release sulfur dioxide, sodium hydroxide is added to said spent liquor before or after the addition of sulfuric acid to transform ammonium sulfate into sodium sulfate with release of ammonia, the spent liquor thus treated is added to the black liquor from the sulfate process, water is added to the released ammonia and sulfur dioxide, the latter two compounds are reacted to form a solution of ammonium bisulfite or ammonium sulfite, and said solution is used in the sulfite or bisulfite pulping process.

The addition of sulfuric acid to the spent liquor from the ammonium sulfite or ammonium bisulfite process results in a release of sulfur dioxide from the spent liquor and in a formation of ammonium sulfate in the spent liquor. The spent liquor is desirably heated before addition of the sulfuric acid in order to reduce the solubility of the sulfur dioxide and to promote the expulsion of sulfur dioxide from the spent liquor. The addition of sulfuric acid may be controlled in dependence on the pH value of the spent liquor. When the sulfite or bisulfite in the spent liquor has been transformed into sulfate by the added sulfuric acid, sodium hydroxide solution for expelling ammonia is added to the spent liquor, which now contains ammonium sulfate. Sodium sulfate is thus formed in the spent liquor. The addition of sodium hydroxide solution may also be controlled in dependence on the pH value of the solution. The spent liquor is then supplied as make-up to a sulfate or kraft pulping process and is mixed with the black liquor. The sulfur dioxide and ammonia gases released from the spent liquor, as a result of the treatment with sulfuric acid and sodium hydroxide, are absorbed in water in an absorber so that ammonium sulfite or ammonium bisulfite are reformed. The solution which contains ammonium sulfite or ammonium bisulfite and which flows out of the absorber is reused for digesting the wood.

In the process, according to the invention, ammonium sulfite or ammonium bisulfite is recovered from the spent liquor which contains ammonium sulfite or ammonium bisulfite and is reused for pulping. The treated spent liquor from the ammonium bisulfite or ammonium sulfite process is used as make-up for a known sulfate process so that chemicals consumed in the sulfate process are supplied from the spent liquor from the ammonium sulfite or ammonium bisulfite process. The chemicals consumed in the ammonium sulfite or ammonium bisulfite pulping process are supplied, e.g., by an addition of ammonia and sulfur dioxide to the absorber. The sulfuric acid and sodium hydroxide solution may be supplied as waste sulfuric acid and waste sodium hydroxide solution. The method, according to the invention, for a joint production of pulp in a kraft process and in an ammonium sulfite or ammonium bisulfite process can be carried out with an expenditure of chemicals which is virtually not higher than in a kraft process alone whereas the ammonium sulfite or ammonium bisulfite process can be carried out virtually without an expenditiure of chemicals.

The ammonium sulfite or ammonium bisulfite pulping process may be any of the known sulfite processes (acid, neutral, or alkaline) in which ammonia is used as a base. The wood can be pulped in a chemical pulping process or in a semi-chemical (combined chemical and mechanical) pulping process, by which the so-called hemicelluloses are produced. A conventional semi-chemical pulping process is known as NSSC (neutral sulfite semi-chemical) pulping process.

The method, according to the invention, permits of a recovery of ammonia and sulfur dioxide from any spent liquor which contains ammonium sulfite or ammonium bisulfite and an absorption of the recovered chemicals in water whereafter they can be reused for pulping.

In an ammonium sulfite process or an NSSC pulping process using ammonia, it is generally desirable to treat the alkaline spent liquor first with sodium hydroxide solution and subsequently with sulfuric acid because part of the chemicals when added in the reverse order are consumed merely for a neutralization of the liquor. Sulfuric acid is preferably added to a spent liquor which contains ammonium bisulfite before the sodium hydroxide solution.

Figure 2:
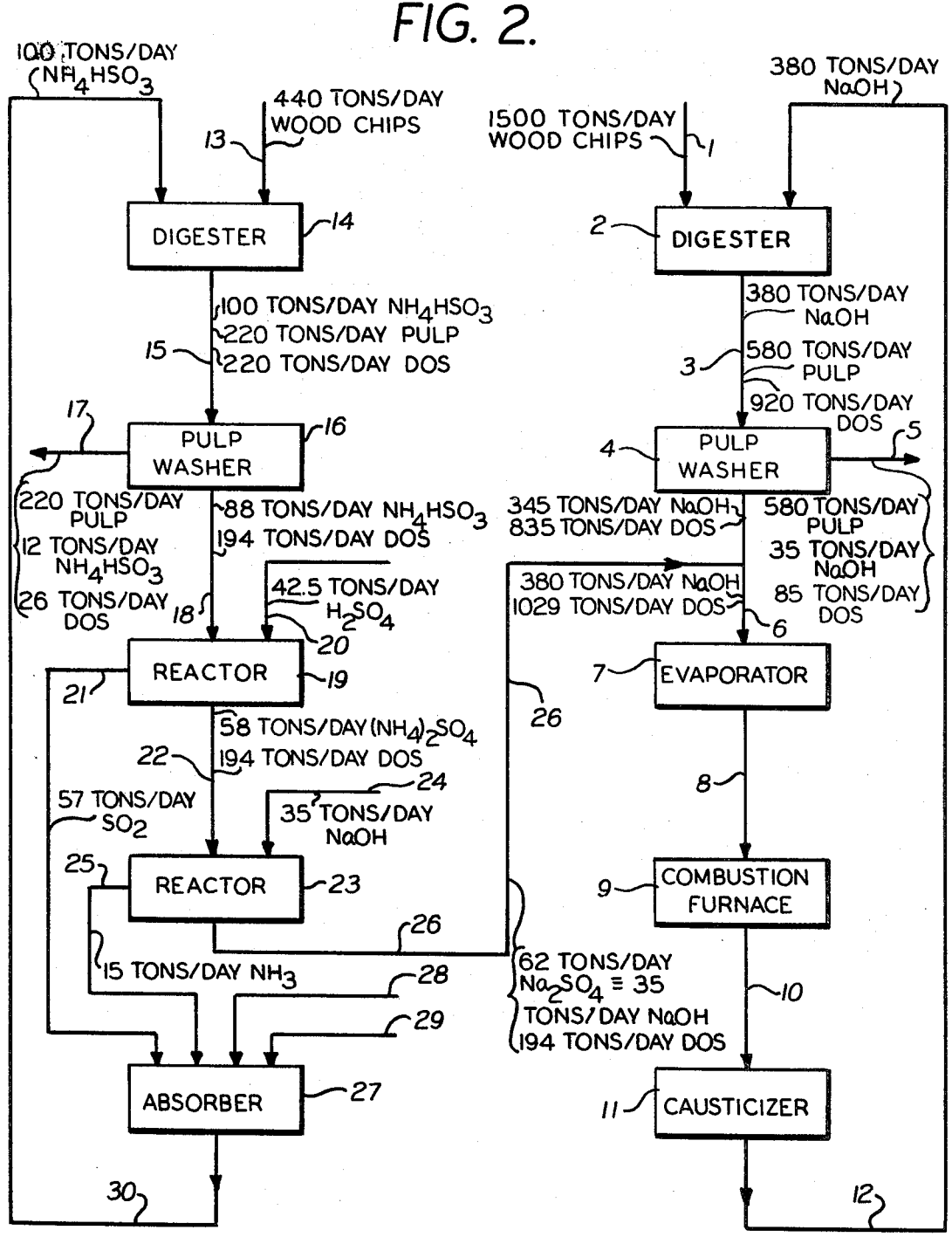

The invention will be explained further with reference to the drawings, in which:

FIG. 1 is a block flow diagram illustrating by way of example a plant for carrying out the method according to the invention; and FIG. 2 is a block diagram with data illustrating an example.

the-fidefitafatefietahzzoizc.itwiet fl

In FIG. 1, numerals 1–12 are used in a representation of a conventional sulfate pulping process. Wood chips 1 are supplied to a sulfate process digester 2. The content of the digester is supplied through a conduit 3 to a pulp washer 4. where the recovered pulp is separated from the spent liquor and rewashed. The resulting pulp is discharged from the plant through a conduit 5 and subjected to further processing (mechanical treatment, bleaching, etc.). The spent liquor withdrawn from the pulp washer 4 is called black liquor owing to its dark color and is passed through a conduit 6 to an evaporator 7 and further through a conduit 8 to a combustion furnace 9. The combustion residues ($Na_2S$ and $Na_2CO_3$) are dissolved and passed through a conduit 10 into a causticizer 11, where the solution is treated with lime so that calcium carbonate and sodium hydroxide are formed from sodium carbonate and lime. The precipitated calcium carbonate is separated. The solution is now recycled as white liquor through a conduit 12 to the sulfate process digester 2.

Wood chips 13 are supplied to an ammonium bisulfite process digester 14. The contents of the digester are supplied through a conduit 15 to a pulp washer 16. The pulp which has been separated from the spent liquor of the ammonium bisulfate process and which has been washed is withdrawn through a conduit 17 and subjected to further processing. The spent liquor which contains ammonium bisulfite is passed from the pulp washer through a conduit 18 into a reactor 19 where sulfuric acid is supplied through a conduit 20 to the spent liquor. The spent liquor is desirably heated before the sulfuric acid is added. The spent liquor may be heated, e.g., by an indirect heat exchange with part of the hot combustion gases produced in the combustion furnace 9. The supply of sulfuric acid through the conduit 20 is suitably controlled in dependence on the pH value of the spent liquor. This pH value is measured in reactor 19. The sulfur dioxide which escapes from the spent liquor as a result of the addition of sulfuric acid is passed through a conduit 21 into an absorber 27. The solution is passed through a conduit 22 into a reactor 23, to which sodium hydroxide solution is added through a conduit 24. The addition of the sodium hydroxide solution is suitably controlled in dependence on the pH value, which is measured in the reactor 23. The ammonia which escapes as a result of the addition of the sodium hydroxide solution is passed through a conduit 25 into the absorber 27. Solution is withdrawn from the reactor 23 through a conduit 26 and is admixed to the black liquor in the conduit 6.

Alternatively, the solution withdrawn from the reactor 23 may be concentrated by evaporation and the concentrated solution may be admixed to the black liquor in the conduit 8.

Ammonia and sulfur dioxide react to form ammonium bisulfite in the absorber 27, which is e.g., a packed absorber. Water is supplied into the absorber through a conduit 28. The ammonium bisulfite (or ammonium and sulfur dioxide) consumed in the process is replenished through conduit 39. The ammonium bisulfite solution, withdrawn from the absorber through a conduit 30 is supplied to the ammonium bisulfite process digester 14. In the method, according to the invention, the ammonium bisulfite from the pulping process is recovered from the spent liquor and recycled to the pulping process.

The solution supplied to the kraft pulping process through the conduit 26 contains the chemicals required in the kraft pulping process and together with the black liquor passes through the combustion furnace 9 and the causticizer 11.

The ammonium bisulfite digester 14 and the pulp washer 16 are operated in known manner. The reactors 19 and 23 desirably contain stirrers. The solution which is withdrawn through the conduit 26 from the reactor 23 may be treated first with yeast for a utilization of reducing organic substances and is then admixed with the black liquor in the conduit 6 or, after a concentration by evaporation, in the conduit 8.

In the simultaneous production of pulp by the sulfate process and the ammonium sulfite process or an NSSC process using ammonia, sodium hydroxide solution supplied through the conduit 20 is added, in the reactor 19, to the spent liquor which contains ammonium sulfite. Sulfuric acid, supplied through the conduit 24, is subsequently added in the reactor 23. These treatments result in an escape of ammonia through the conduit 21 and of sulfur dioxide through the conduit 25. Any treatment of the spent liquor containing ammonium sulfite with yeast is carried out immediately after the pulp washer 16. In other respects, the procedure is the same as that described with reference to FIG. 1 for the combined kraft and ammonium bisulfite process.

EXAMPLE

FIG. 2 shows the same block diagram as FIG. 1 but contains also the data for the operation of an ammonium bisulfite process and a sulfate process. In the sulfate process, the total of chemicals NaOH and $Na_2S$ is stated in the usual manner as NaOH. DOS means "dry organic solids."

The calculations are based on the following cost of chemicals:

|  | U.S. dollars per metric ton |
|---|---|
| NaOH | $75 |
| $H_2SO_4$ | 20 |
| $NH_3$ | 150 |
| Sulfur | 50 |
| Salt cake ($Na_2SO_4$) | 31.25 |

As is apparent from FIG. 2, 42.5 tons $N_2SO_4$ and 35 tons $NH_4HSO_3$ are required per day in the process, according to the invention, for a production of 220 tons ammonium bisulfite pulp and 580 tons of kraft pulp per day. In addition, 12 tons of $NH_4SO_4$ per day are made from 2 tons, $NH_3$ and 4 tons of sulfur per day are supplied through conduit 29. This corresponds to the following expenditure of chemicals:

| | |
|---|---|
| 42.5 tons $H_2SO_4$ at $20/ton | $850 |
| 35 tons NaOH at $75/ton | 2625 |
| 2 tons $NH_3$ at $150/ton | 300 |
| 4 tons sulfur at $50/ton | 200 |
| | 3975 |

In the previously known practice, the requirements are as follows:

(a) 125 tons salt cake as make-up for producing 580 tons kraft pulp;

(b) 100 tons $NH_4HSO_3$ for producing 220 tons sodium bisulfite pulp. 100 tons $NH_4HSO_3$ are made from 17 tons $NH_3$ and 32 tons sulfur (when burnt to $SO_2$). As a result, the following chemical expenditure is required for the—

Ammonium bisulfite pulp:

| | |
|---|---|
| 17 tons $NH_3$ at $150.00 per ton | $2,550.00 |
| 35 tons S at $50.00 per ton | 17,500.00 |
| 100 tons $NH_4HSO_3$ | 20,050.00 |

And for the production of —
Kraft pulp:

| | |
|---|---|
| 125 tons salt cake at $31.25 per ton | 3,906.25 |
| | 23,956.25 |

The comparison has been based on the costs of pure sulfuric acid and pure sodium hydroxide solution. If low-cost waste sulfuric acid and low-cost waste sodium hydroxide solution are used in the method according to this invention, the cost of performing such method will be reduced.

It is apparent from the above calculation that virtually no chemical expenditure is involved in the production of 220 tons sodium bisulfite pulp per day in the method according to the invention.

What is claimed is:

1. In the production of wood pulp by the conventional ammonium sulfite and bisulfite process and the sodium sulfate process; the improvement which comprises treating the sulfite and bisulfite process spent liquor with sulfuric acid and sodium hydroxide whereby producing sodium sulfate, ammonia and sulfur dioxide; separating said ammonia and said sulfur dioxide from said spent liquor and absorbing such in water to produce ammonium sulfite and bisulfite; feeding said ammonium sulfite and bisulfite to said ammonium pulping process; and feeding said sodium sulfate to a liquor recovery system of said sulfate pulping process.

2. The improved process claimed in claim 1 including adding said sodium sulfate to the black liquor of said sulfate process, concentrating the resulting liquor, burning the concentrated liquor, dissolving the combustion residue in water, treating the resulting solution with caustic, and treating wood pulp with the caustic solution.

3. The improved process claimed in claim 1, including first treating said spent liquor with said sulfuric acid and then treating the resulting product with sodium hydroxide.

4. The improved process claimed in claim 1, including first treating said spent liquor with said sodium hydroxide and then treating the resulting product with sulfuric acid.

5. The improved process claimed in claim 1, including heating said spent liquor prior to said sulfuric acid and sodium hydroxide treatment.

6. The improved process claimed in claim 5, wherein said heating is by indirect heat exchange.

7. The improved process claimed in claim 1, wherein said sulfuric acid and said sodium hydroxide are both waste streams.

References Cited

UNITED STATES PATENTS

| 2,047,032 | 7/1936 | Richter | 162—33 |
|---|---|---|---|
| 2,897,148 | 7/1959 | Laboureur | 210—11 |
| 2,974,081 | 3/1961 | Biggs, Jr. et al. | 162—33 |

FOREIGN PATENTS

| 555,458 | 4/1958 | Canada | 162—30 |
|---|---|---|---|
| 618,212 | 4/1961 | Canada | 23—48 |

L. LEON BASHORE, Primary Examiner

T. G. SCAVONE, Assistant Examiner

U.S. Cl. X.R.

23—48, 130; 162—30, 36, 45